United States Patent
Stuible et al.

[19]

[11] Patent Number: 6,044,320
[45] Date of Patent: Mar. 28, 2000

[54] PROCESS AND DEVICE FOR GENERATING AN ERROR SIGNAL IN A MOTOR VEHICLE

[75] Inventors: Ewald Stuible, Eberdingen; Walter Berger, Erligheim; Robert Weiland, Gerlingen, all of Germany

[73] Assignee: Robert Bosch GmbH, Stuttgart, Germany

[21] Appl. No.: 08/933,549

[22] Filed: Sep. 19, 1997

[30] Foreign Application Priority Data

Sep. 19, 1996 [DE] Germany .................. 196 38 280

[51] Int. Cl.$^7$ ...................................... B60T 8/66
[52] U.S. Cl. .................. 701/72; 701/75; 180/197
[58] Field of Search ..................... 701/72, 74, 75, 701/71, 79, 82, 89; 180/197, 199, 410, 423

[56] References Cited

U.S. PATENT DOCUMENTS

| | | | |
|---|---|---|---|
| 4,042,059 | 8/1977 | Bertolasi | 180/271 |
| 4,777,611 | 10/1988 | Tashiro et al. | 701/148 |
| 5,373,447 | 12/1994 | Howes et al. | 701/91 |
| 5,490,070 | 2/1996 | Kiryu et al. | 701/70 |
| 5,631,836 | 5/1997 | Poggenburg et al. | 701/71 |
| 5,748,474 | 5/1998 | Masuda et al. | 701/90 |

FOREIGN PATENT DOCUMENTS 2 242 244  9/1991  United Kingdom .

OTHER PUBLICATIONS

Bosch Technische Berichte (Bosch Technical Reports), vol. 7, No. 2 (1980).*

ATZ, Automobiltechnisches Zeitschrift (Automotive Engineering Journal), vol. 96 (1994).*

*Primary Examiner*—Tan Nguyen
*Attorney, Agent, or Firm*—Kenyon & Kenyon

[57] ABSTRACT

An error signal is generated in a motor vehicle with at least two wheels located on the right and left in the front and rear areas of the motor vehicle. This is accomplished by detecting signals representing the rotational speeds of the vehicle wheels. In addition, cornering is detected, depending on the signals detected in particular. The signals detected in cornering are then compared with an ideal cornering performance, whereupon the error signal is generated, depending on the result of the comparison. With the comparison, it is possible to detect by a simple method erroneous rotational speed sensor signals, e.g., due to transposition of the lines.

29 Claims, 5 Drawing Sheets

PROCESS AND DEVICE FOR GENERATING AN ERROR SIGNAL IN A MOTOR VEHICLE

BACKGROUND INFORMATION

Systems that control or regulate the driving stability of a motor vehicle are known in a plurality of embodiments from the related art. For example, there are known anti-lock control systems; reference is made here to the document *Bosch Technische Berichte* (*Bosch Technical Reports*), vol. 7, no. 2 (1980) only as an example. With such anti-lock control systems, the brake systems of the vehicle wheels are controlled so that a change in brake action, usually the brake pressure, occurs as a function of an instability value. This instability value is generated as a function of the wheel movement detected, usually the wheel rotational speed. In addition, there are known traction control systems where the vehicle engine and/or the brakes of a vehicle are controlled to prevent excessive drive slip. Furthermore, there are known systems for controlling the dynamics of vehicular motion, where a parameter that represents and/or influences the dynamics of vehicular motion is determined; such parameters include yaw angular velocity, steer angle and/or transverse acceleration of the vehicle. The brake systems and/or the power-train system are controlled as a function of these measured quantities and as a function of the measured rotary motion of the vehicle wheels to increase driving stability. Such a system is known, for example, from ATZ, *Automobiltechnisches Zeitschrift* (*Automotive Engineering Journal*), vol. 96 (1994) "Bosch FDR—Driving Dynamics Control System." In such driving stability systems, it is customary to detect different diameters of the vehicle wheels by means of tire tolerance compensation or wheel compensation and then to take this into account in determining the wheel motion.

In such systems, which function according to the wheel motion sensed, prompt and accurate identification of errors in detecting wheel motion is extremely important.

An object of the present invention is to detect an error in wheel motion sensing as easily and effectively as possible.

SUMMARY OF THE INVENTION

The present invention concerns the generation of an error signal in a motor vehicle with at least two wheels located on the right and left in the front and rear areas of the vehicle. This is accomplished by detecting signals representing the rotational speeds of the vehicle wheels. In addition, cornering in particular is detected as a function of the signals detected, but cornering can also be detected directly, e.g., by analyzing a steer angle signal. The signals detected during cornering are then compared according to the present invention with an ideal cornering performance, whereupon the error signal is generated, depending on the result of the comparison according to the present invention.

In a first embodiment of the present invention, at least two differences between the rotational speeds of at least two wheels, one on the right and one on the left, located in the front and rear areas of the vehicle, are determined and the resulting differences are compared with an ideal cornering performance.

In a second embodiment of the present invention, an actual sequence is determined, depending on the value of the signal, and the actual sequence thus determined is compared with an ideal cornering performance.

The comparison provided according to the present invention between the actual wheel rotational speed performance in cornering and a corresponding ideal performance makes it possible to easily detect erroneous rotational speed sensor signals. Such an error can occur, for example, due to transposition of the rotational speed sensor lines. These lines, which transmit the wheel rotational speed signals between the rotational speed sensors and the respective control devices, can be transposed laterally during a repair, for example, which is facilitated by lines of equal length. The quality of the driving stability control is greatly impaired by such transposition of the rotational speed sensor lines, because the wheel speed information leads to erroneous actuator triggering. Thus, lateral transposition of rotational speed sensor lines results in brake pressure valve triggering on the wrong wheel brake. Due to the comparison according to the present invention, the wheel rotational speeds in cornering are tested for plausibility, and the error signal is generated when the result of the comparison is implausible.

In an advantageous embodiment of the first variant of the present invention, the error signal is generated as a function of a comparison of the plus or minus signs of the wheel rotational speed differences thus determined. This embodiment of the present invention is based on an analysis of wheel speed differences in cornering. It is assumed here that the signs of the wheel rotational speed differences at the front and rear axles are the same in cornering when the rotational speed sensor lines are connected correctly. If this is not the case, there is an error, e.g., due to transposition of the rotational speed sensor lines.

In another advantageous embodiment of the first variant of the present invention, the comparison according to the present invention is based only on the detected wheel rotational speed differences that exceed preselectable threshold values. In this embodiment, only the wheel rotational speed differences during cornering with a certain minimum curvature are used to generate the error signal. Due to this embodiment, only the operating states (cornering with a minimum curvature) where rotational speed sensor lines have obviously been transposed laterally are used for error detection.

In addition, within the scope of the first variant of the present invention, the error signal is generated when the signs of the differences determined are different. As mentioned above, this embodiment is based on the different wheel rotational speeds during cornering. Thus, the wheels on the inside of the curve in cornering have a lower wheel rotational speed than the wheels on the outside of the curve.

In the second variant of the present invention, it is possible for the actual sequence determined to be compared with at least two ideal sequences for cornering.

It is especially advantageous if the error signal is generated when the signals detected during cornering and the ideal performance during cornering are different for a predetermined length of time. This embodiment has the advantage that the error signal is not generated the very first time an implausible wheel rotational speed performance is detected when cornering, but instead an error is identified only when the implausible performance persists for a certain period of time. This makes the error detection according to the present invention more reliable.

As mentioned previously, the wheel rotational speed signals detected are used for controlling and/or regulating the driving stability of the vehicle. In reaction to the generation of the error signal according to the present invention, the control and/or regulation of driving stability of the vehicle can be modified; this refers in particular to interruption of control and regulation processes. This effectively prevents the faulty brake pressure valve triggering mentioned above. In addition, the error signal generated can be displayed for the driver of the vehicle.

DETAILED DESCRIPTION

Figure 1:
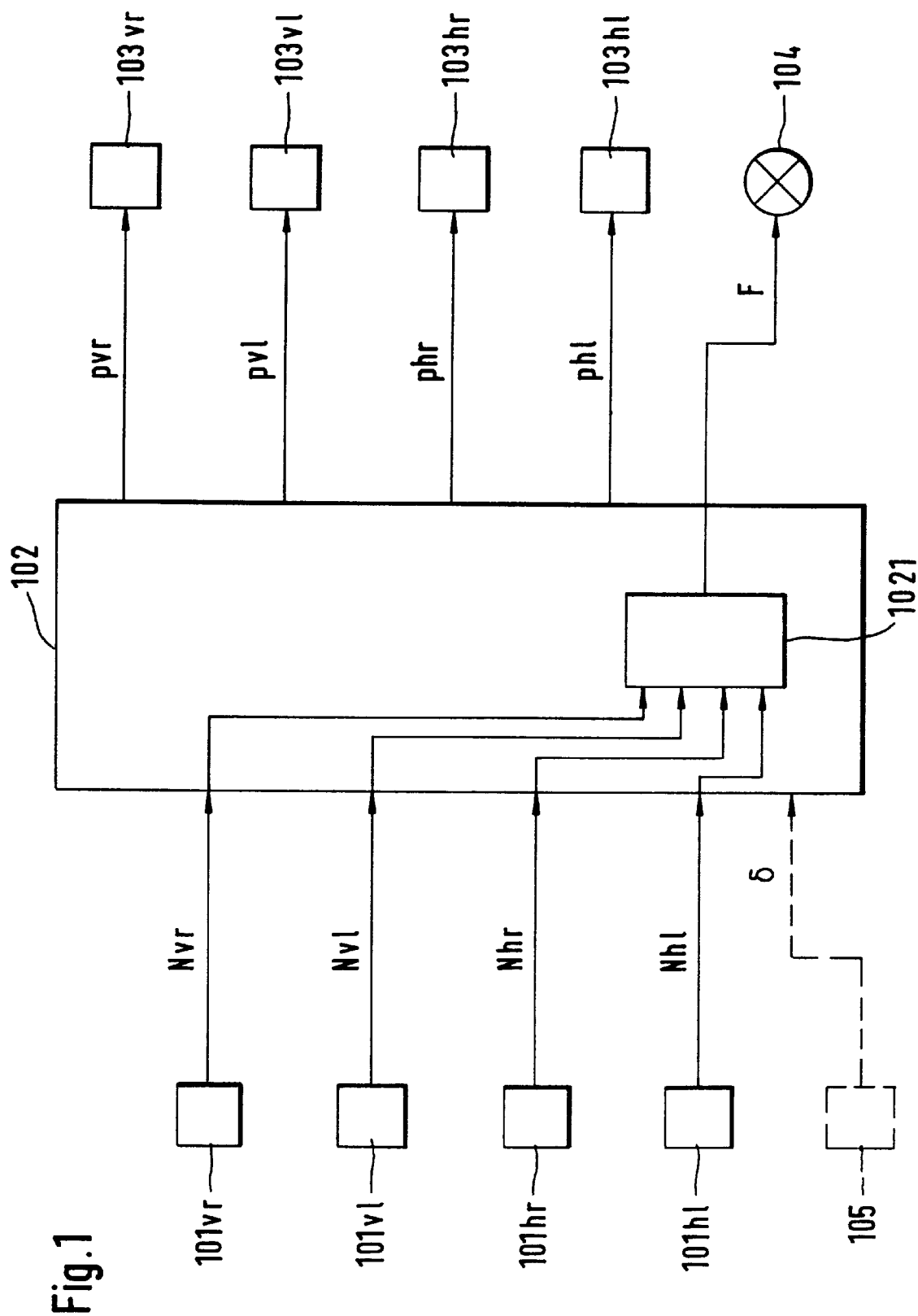
FIG. 1 shows a block diagram according to the present invention.

In FIG. 1, 101vr, 101vl, 101hr and 101hl denote the wheel rotational speed sensors that sense the wheel rotational speeds of a four-wheel vehicle. Wheel rotational speed sensors 101ij (where I denotes the assignment to the front [v] and rear [h] axles and j denotes the assigrnent to the right [r] and left [l] sides of the vehicle) are sent over rotational speed sensor lines to driving stability control device 102. The wheel rotational speed sensor signals are processed in control device 102 in a known way, optionally by combining with additional sensor signals, to yield control signals pij of wheel brakes 103ij. Output signal δ (if available) of a steering angle sensor 105 can also be sent to control device 102.

The present invention concerns part 1021 of control device 102 which detects an error, which may be due to transposition of the rotational speed sensor lines, for example. In reaction to the detection of such an error, display device 104 is actuated by signal F. At the same time, the control or regulation is modified internally within the control device so that there cannot be any critical actuator triggering pij. In particular, the control or regulation of wheel brakes 103ij is suppressed when an error is detected, and only a brake pressure selected by the driver is built up or reduced.

Figure 2:
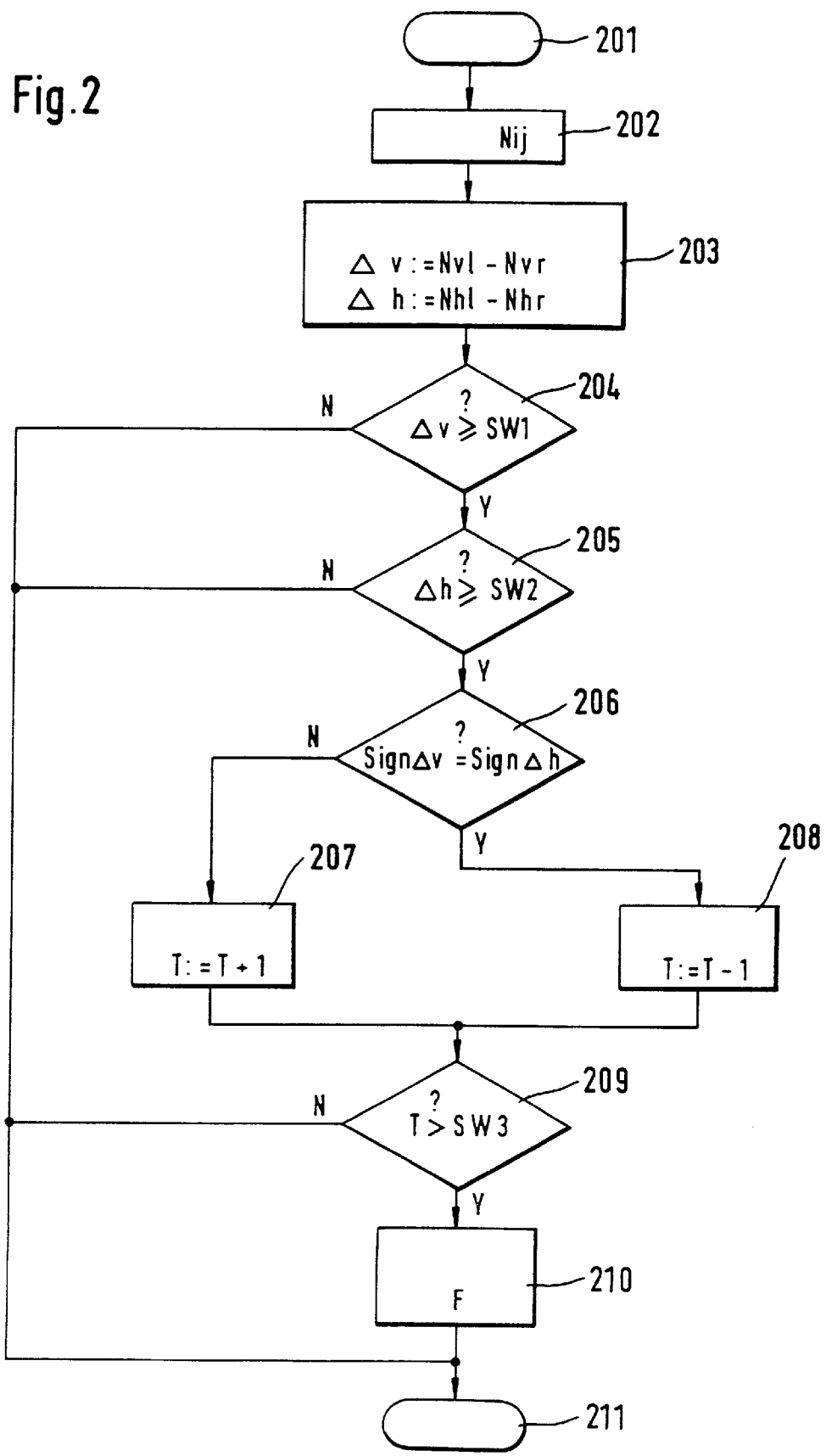
FIG. 2 shows a first flow chart according to the present invention.
Figure 3:
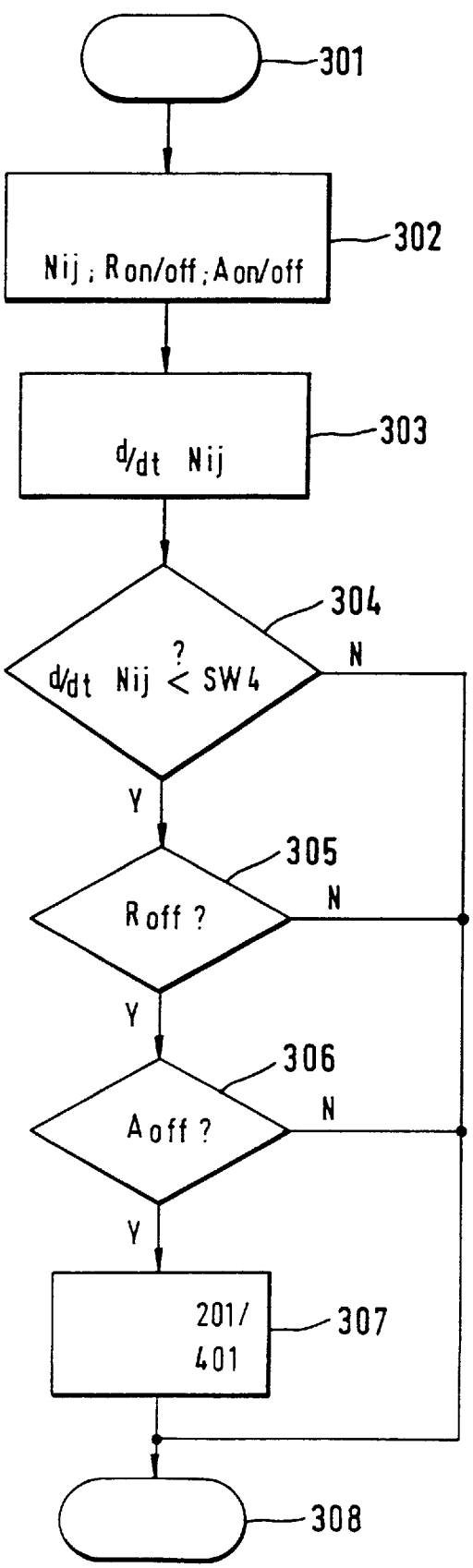
FIG. 3 shows a second flow chart according to the present invetion.
Figure 4:
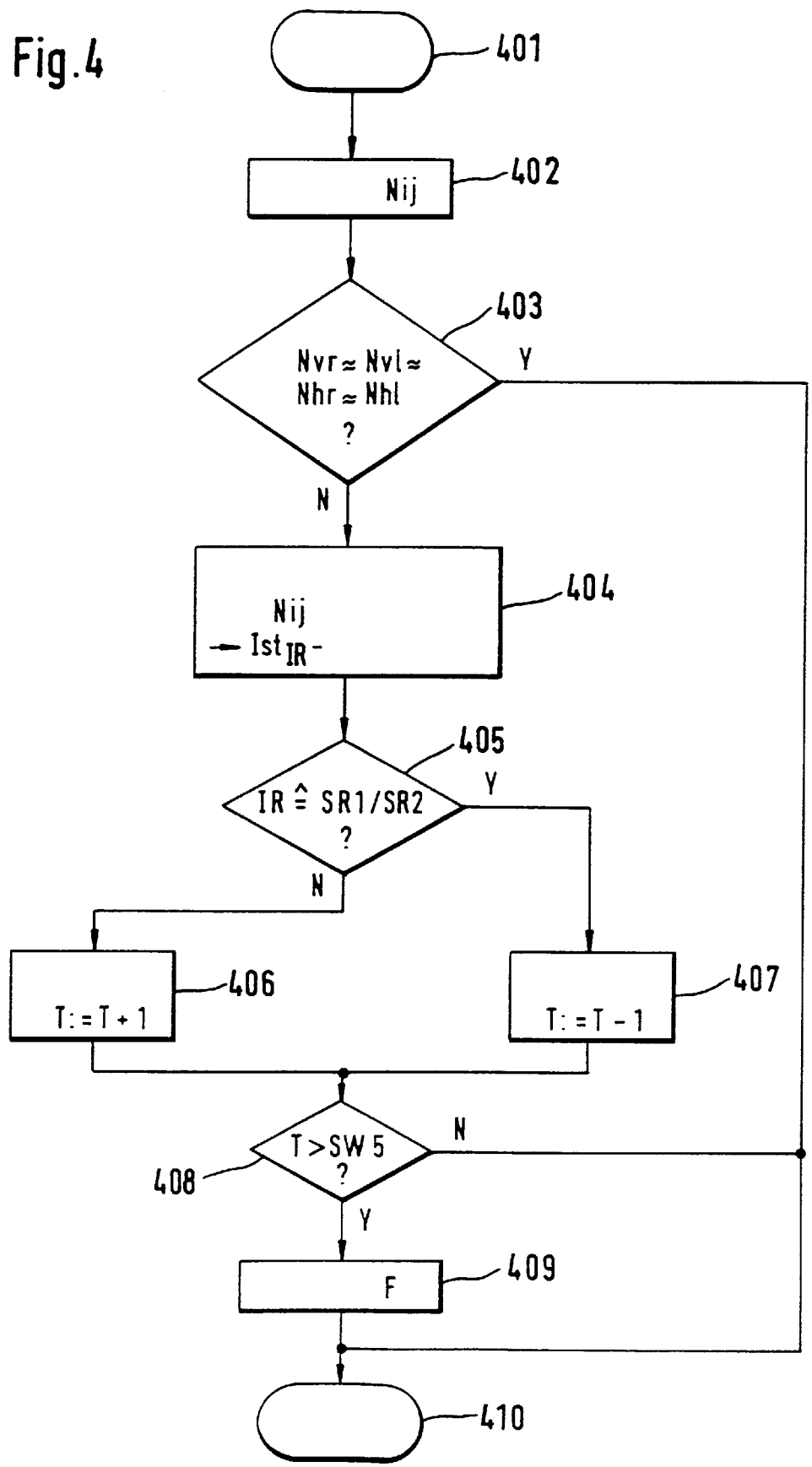
FIG. 4 shows a third flow chart according to the present invention.

FIGS. 2 and 4 show the detailed functioning of block 1021 in FIG. 1 in first and second variants, where the sequence of FIG. 4 can be run through before the sequences illustrated in FIGS. 2 and 3.

In FIG. 3, wheel rotational speed signals Nij and the current $R_{on/off}$ and $A_{on/off}$ values are entered after start step 301. The $R_{on/off}$ value indicates whether the overall system illustrated in FIG. 1 is in driving stability regulation or control. In the case of an ABS control system, for example, this means that the $R_{on}$ value indicates that the brake pressure is currently being influenced to prevent brake locking. The $A_{on/off}$ signal indicates whether the above-mentioned tire tolerance compensation or wheel compensation has been terminated ($A_{off}$ value) or not ($A_{on}$ value).

In step 303, wheel accelerations dNij/dt are formed from wheel rotational speeds Nij to determine in step 304 whether all the wheel accelerations dNij/dt are smaller than a (relatively large) threshold value SW4. If this is not the case, the error detection illustrated in FIGS. 2 and 4 is not activated with end step 308. If this is the case, then step 305 ascertains whether an intervention in the driving dynamics is currently taking place ($R_{on}$) or not ($R_{off}$). If such an intervention in the driving dynamics is taking place, the error recognition illustrated in FIGS. 2 and 4 is not activated with end step 308. However, if this is the case, step 306 ascertains whether the tire tolerance compensation and wheel compensation are concluded ($A_{off}$) or not ($A_{on}$). If the tire tolerance compensation and wheel compensation are not concluded ($A_{on}$), the error detection illustrated in FIGS. 2 and 4 is not activated with end step 308. Otherwise, one (or both) of the embodiments of the invention illustrated in FIGS. 2 and 4 is started in step 307.

The sequence illustrated in FIG. 3 ensures that there will not be a faulty error detection due to the wheel rotational speeds being falsified due to an instantaneous control measure, or because the tire tolerance compensation or wheel compensation is not yet concluded, or because of excessive wheel acceleration.

After starting step 201 in the variant illustrated in FIG. 2, wheel rotational speed signals Nij are entered in step 202. Differences Δv and Δh between the wheel rotational speeds at the front axle and on the rear axle are formed in step 203. In step 204, the wheel rotational speed difference at the front axle is tested to determine whether it exceeds a threshold value SW1, while in step 205, the wheel rotational speed difference at the rear axle is tested to determine whether it exceeds threshold value SW2. If the wheel rotational speed differences do not exceed threshold values SW1 and SW2, end step 211 is triggered directly. However, if both wheel rotational speed differences Δv and Δh exceed the respective threshold values SW1 and SW2, this means that the vehicle is cornering. Then in step 206, sign Δv of the wheel rotational speed difference at the front axle is compared with sign Δh of the wheel rotational speed difference at the rear axle.

If it is found in step 206 that the wheel rotational speed differences at the front and rear axles have different signs, a count T is incremented in step 207. However, if it is found in step 206 that the signs are the same, count T is decremented in step 208. In the following step 209, the current count T is compared with threshold value SW3. If the current count does not exceed threshold SW3, end step 211 is triggered directly. However, if current count T exceeds threshold SW3, error signal F is generated in step 210. After end step 211, the sequence illustrated in FIG. 3 is started again.

Due to the fact that the sequence illustrated in FIG. 2 is run through with a certain timing, a certain period of time in which different signs were detected can be assigned to count T directly. An example of threshold value SW3 in step 209 is 60 seconds.

It is shown clearly with reference to FIG. 2 that the invention is based on an analysis of wheel speed differences during cornering. The following are differentiated:

a) no cornering b) plausible cornering c) implausible cornering.

Plausible Cornering

The difference between the wheel speeds of the right and left wheels on the front axle and the difference between the wheel speeds of the right and left wheels on the rear axle have the same sign and the absolute values of both exceed threshold values SW1 and SW2.

Implausible Cornering

The difference between the wheel speeds of the right and left wheels on the front axle and the difference between the wheel speeds of the right and left wheels on the rear axle have different signs and the absolute values of both exceed threshold values SW1 and SW2.

No Cornering

There is neither plausible cornering nor implausible cornering in the sense defined above.

Error filtering (steps 207, 208 and 209) is accomplished by incrementing count T in implausible cornering and decrementing count T in plausible cornering. Count T remains the same when there is no cornering. An error is identified at a certain error filter status, e.g., corresponding to cornering that lasts for 60 seconds.

Threshold values SW1 and SW2 may be composed of a constant component that serves to suppress speed-independent measurement errors and a speed-dependent component that serves to tolerate differences in tire equipment, e.g., in the event there is no tire compensation or wheel tolerance compensation.

Figure 5:
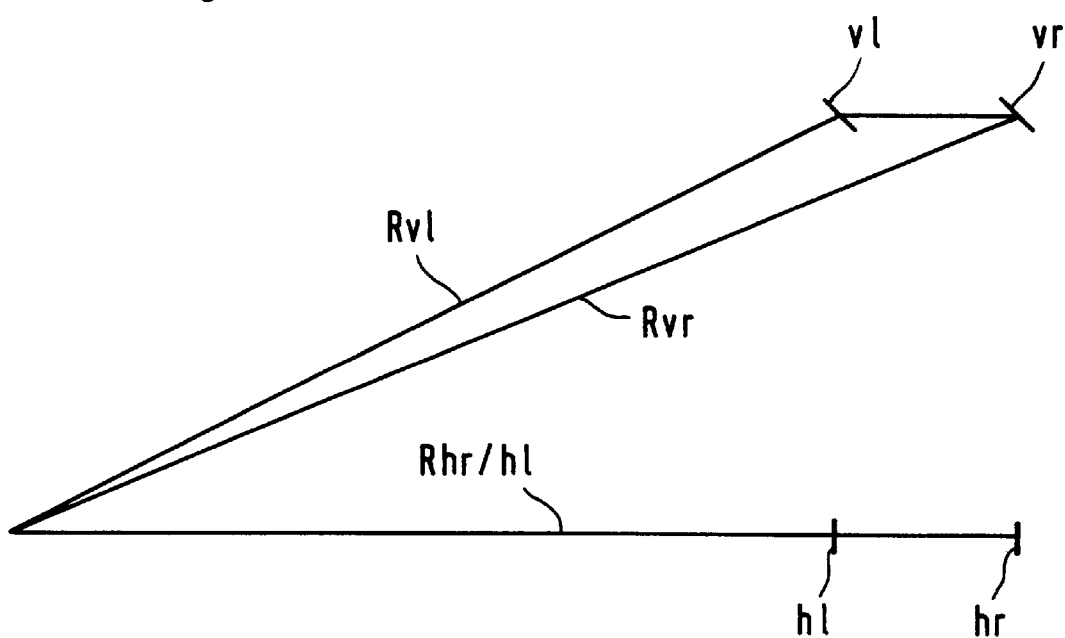
FIG. 5 illustrates the rotational speed performance in cornering.

The second variant of the present invention is based on the state of affairs illustrated in FIG. 5. It can be seen here that vehicle wheels vl, vr, hl and hr describe different curve radii $R_{vl}$, $R_{vr}$ and $R_{hr/hl}$ in cornering (front wheels vl and vr have a steering angle). This means that in cornering with a four-wheel vehicle, only the following two sequences of wheel rotational speeds Nij are possible:

Turning Right:

Nvl>Nhl>Nvr>Nhr

Turning Left:

Nvr>Nhr>Nvl>Nhl

These two sequences shall be ideal sequences SR1 and SR2.

In the second variant described in FIG. 4, wheel rotational speed signals Nij are entered in step 402 after starting step 401. In step 403, a check is performed to determine whether all wheel rotational speeds Nij are approximately the same, i.e., whether they are all within a (relatively narrow) band. If this is the case, the vehicle is driving straight or is turning only slightly, whereupon end step 410 is triggered directly.

However, if wheel rotational speeds Nij are sufficiently different, they are sorted by comparison of values and/or by forming the difference in values. This yields an actual sequence IR. In the next step 405, this actual sequence IR is compared with the two abovementioned ideal sequences SR1 and SR2. If the actual sequence IR corresponds to one of the two ideal sequences SR1 or SR2, this is plausible cornering, whereupon in step 407 a count T is decremented. Otherwise (actual sequence IR does not correspond to either of the two ideal sequences SR1 or SR2), count T is incremented in step 407.

In the following step 408, current count T is compared with threshold value SW5. If the current count does not exceed threshold SW5, end step 410 is triggered directly. However, if current count T exceeds threshold SW5, error signal F is generated in step 409. After end step 410, the sequence illustrated in FIG. 3 is started again.

Incrementing or decrementing count T has the advantages already described with reference to FIG. 2. However, steps 406, 407 and 408 can also be omitted, with output N of step 405 leading directly to step 409 and output Y of step 405 leading directly to end step 410.

In summary, it should be pointed out that detection of axially transposed rotational speed sensor lines is made possible through the present invention after the total time of relevant corner turns exceeds a certain period of time (e.g., 60 seconds). The present invention permits long-term monitoring that is tolerant of errors. Even when the error filter (count T) is incremented in unfavorable driving maneuvers despite correct wiring, the counter filter can be reset again at the next cornering operation.

In addition, it should be pointed out that the embodiments described above activate the curve detection required for error detection according to the present invention by means of the wheel rotational speeds themselves (step 204, 205 or 403). Instead of or in addition to this, however, curve detection can also be performed by another method. For example, output signal δ (if available) of a steering angle sensor 105 can be used for this purpose. Instead of the above-mentioned steps 204, 205 or 403, only steering angle δ is then compared with a corresponding threshold value.

What is claimed is:

1. A process for generating an error signal in a motor vehicle having at least four wheels, comprising the steps of:

detecting signals representing rotational speeds of the vehicle wheels;

detecting cornering as a function of the signals detected;

comparing the signals detected during cornering with an ideal cornering performance; and generating the error signal as a function of the comparison.

2. The process according to claim 1, further comprising the steps of:

determining at least two differences between the rotational speeds of the vehicle wheels, dependent on the signals detected; and comparing the at least two differences with the ideal cornering performance.

3. The process according to claim 2, wherein the error signal is generated when signs of the at least two differences are different.

4. The process according to claim 2, wherein the at least two differences are used for generating the error signal if the at least two differences exceed at least one predefined threshold value.

5. The process according to claim 1, further comprising the steps of:

determining an actual sequence as a function of the signals detected; and comparing the actual sequence with the ideal cornering performance.

6. The process according to claim 5, further comprising the step of:

comparing the actual sequence with at least two ideal cornering sequences.

7. The process according to claim 1, wherein the error signal is generated when an actual performance determined by the signals detected during cornering and the ideal cornering performance differ for a predetermined period of time.

8. The process according to claim 1, further comprising the steps of:

using the detected signals representing the rotational speeds of the vehicle wheels for at least one of regulating and controlling a vehicle driving stability;

interrupting the at least one of the regulation and control of the vehicle driving stability in response to the error signal generated; and displaying the error signal generated for a driver of the vehicle.

9. A device for generating an error signal in a vehicle having at least four wheels, comprising:

means for detecting signals representing rotational speeds of the vehicle wheels;

means for detecting cornering as a function of the detected signals;

means for comparing the signals detected while cornering with an ideal cornering performance; and means for generating the error signal as a function of the comparison.

10. The device according to claim 9, wherein the means for comparing:
   determines at least two differences between the rotational speeds of the wheels depending on the signals detected; and
   compares the at least two differences with the ideal cornering performance.

11. The device according to claim 9, wherein the means for comparing:
   determines an actual sequence as a function of the signals detected; and
   compares the actual sequence with the ideal cornering performance.

12. A method for detecting an error in a vehicle having at least four wheels, comprising the steps of:
   determining a rotational speed of each wheel;
   determining a first speed difference between a first one of the wheels and a second one of the wheels;
   determining a second speed difference between a third one of the wheels and a fourth one of the wheels;
   determining, when at least one of the first and second differences indicates that the vehicle is cornering, whether the indicated cornering is an error by comparing the signs of the first and second speed differences.

13. The method of claim 12, wherein the first and second one of the wheels are front wheels and the third and fourth one of the wheels are rear wheels.

14. The method of claim 12, wherein the at least one of the first and second differences is no less than a first speed difference threshold.

15. The method of claim 14, wherein the at least one of the first and second differences indicates that the vehicle is cornering when the first difference is no less than a first speed difference threshold and the second speed difference is no less than a second speed difference threshold.

16. The method of claim 12, wherein the indicated cornering is determined to be erroneous when the signs of the first and second differences are different.

17. The method of claim 12, comprising the further step of determining a count when the indicated cornering is determined to be erroneous.

18. The method of claim 17, wherein the indicated cornering is determined to be erroneous when signs of the first and second differences are different.

19. The method of claim 18, wherein the step of determining a count further comprises the steps of changing the count in one direction if the indicated cornering is erroneous and changing the count in another direction if the indicated cornering is not erroneous.

20. The method of claim 19, further comprising the step of determining that an error exists when the count is no less than a count threshold.

21. A method for detecting an error condition in a vehicle having at least four wheels, comprising the steps of:
   making a preliminary determination that the vehicle is cornering;
   determining whether the preliminarily indicated cornering is plausible;
   changing a count in one direction when the vehicle is not plausibly cornering and changing the count in another direction when the vehicle is plausibly cornering; and
   determining that an error condition exists when the count is no less than a count threshold.

22. The method of claim 21, wherein the step of making a preliminary determination that the vehicle is cornering includes the substeps of:
   (i) determining a first difference between a speed of a first one of the wheels and a speed of a second one of the wheels;
   (ii) determining a second difference between a speed of a third one of the wheels and a speed of a fourth one of the wheels; and
   (iii) preliminarily determining that the vehicle is cornering when at least one of the first and second speed differences is no less than a first speed difference threshold;
   and wherein the determination as to whether the preliminarily indicated cornering is plausible is based on a comparison of signs of the first and speed differences and data corresponding to a current state of a vehicle steering system.

23. A method for detecting an error condition in a vehicle having at least four wheels, comprising the steps of:
   determining a rotational speed of each wheel;
   determining wheel speed sequence using the rotational speed of each wheel; and
   detecting an error in the determined wheel speed sequence by comparing the determined wheel speed sequence to at least one ideal wheel speed sequence.

24. The method of claim 23, wherein an error is detected in the determined wheel speed sequence when the determined wheel speed sequence does not correspond to the at least one ideal wheel speed sequence.

25. The method of claim 24, wherein the at least one ideal wheel speed sequence includes a first ideal wheel speed sequence and a second ideal wheel speed sequence.

26. The method of claim 25, wherein the first ideal wheel speed sequence corresponds to a condition in which the vehicle is turning in one direction and the second ideal wheel speed sequence corresponds to a condition in which the vehicle turning in another direction.

27. A method for detecting an error condition for use with a vehicle having at least four wheels, comprising the steps of:
   determining a rotational speed of each wheel;
   determining if a vehicle dynamic driving system is not in a controlling mode;
   determining if a vehicle compensation system is not active;
   determining an acceleration of each wheel;
   determining if at least one wheel acceleration is no larger than a wheel acceleration threshold; and
   detecting an error condition only when at least one of the following conditions exists:
   (i) the vehicle dynamic driving system is not in a controlling mode;
   (ii) the vehicle compensation system is not active; and
   (iii) the at least one wheel acceleration is no larger than the wheel acceleration threshold.

28. The method of claim 27, wherein the acceleration of each wheel is determined by differentiating the rotational speed of each wheel.

29. The method of claim 27, wherein the vehicle dynamic driving system is an anti-lock braking system and the vehicle compensation system is a wheel tolerance compensation system.

* * * * *